United States Patent
Tsuchida et al.

(10) Patent No.: US 8,443,008 B2
(45) Date of Patent: May 14, 2013

(54) COOCCURRENCE DICTIONARY CREATING SYSTEM, SCORING SYSTEM, COOCCURRENCE DICTIONARY CREATING METHOD, SCORING METHOD, AND PROGRAM THEREOF

(75) Inventors: Masaaki Tsuchida, Tokyo (JP); Hironori Mizuguchi, Tokyo (JP); Dai Kusui, Tokyo (JP)

(73) Assignee: NEC Corporation, Tokyo (JP)

( * ) Notice: Subject to any disclaimer, the term of this patent is extended or adjusted under 35 U.S.C. 154(b) by 223 days.

(21) Appl. No.: 12/922,320

(22) PCT Filed: Apr. 1, 2009

(86) PCT No.: PCT/JP2009/056804
§ 371 (c)(1),
(2), (4) Date: Sep. 13, 2010

(87) PCT Pub. No.: WO2009/123260
PCT Pub. Date: Oct. 8, 2009

(65) Prior Publication Data
US 2011/0055228 A1    Mar. 3, 2011

(30) Foreign Application Priority Data

Apr. 1, 2008  (JP) ................................ P2008-094980
May 12, 2008  (JP) ................................ P2008-124254

(51) Int. Cl.
*G06F 17/30* (2006.01)
(52) U.S. Cl.
USPC .......................................... 707/803; 707/804
(58) Field of Classification Search .................. 707/803, 707/804
See application file for complete search history.

(56) References Cited

U.S. PATENT DOCUMENTS
6,154,737 A * 11/2000 Inaba et al. .................... 707/696

FOREIGN PATENT DOCUMENTS
JP   2006215850 A   8/2006

OTHER PUBLICATIONS

A. Aizawa, "Kyoki Ni Motozuku Ruijisei Syakudo (Cooccurrence-based Similarity Criteria)", Operation research as a management science research, vol. 52, No. 11, 2007, pp. 706-712.
T. Hofmann, "Probabilistic Latent Semantic Indexing", Proc. of SIGIR'99, 1999, pp. 50-57.
M. A. Hearst, "TextTiling: Segmenting Text into Multi-paragraph Subtopic Passages", Computational Linguistics, vol. 23, No. 1, 1997, pp. 33-64.

* cited by examiner

*Primary Examiner* — Baoquoc N To

(57) ABSTRACT

A cooccurrence dictionary creating system includes: a language analyzing section which subjects a text to a morpheme analysis, a clause specification, and a modification relationship analysis between clauses, a cooccurrence relationship collecting section which collects cooccurrences of nouns in each clause of the text, modification relationships of nouns and declinable words, and modification relationships between declinable words as cooccurrence relationships, a cooccurrence score calculating section which calculates a cooccurrence score of the cooccurrence relationship based on a frequency of the collected cooccurrence relationship, and a cooccurrence dictionary storage section which stores a cooccurrence dictionary in which a correspondence between the calculated cooccurrence score and the cooccurrence relationship is described.

36 Claims, 14 Drawing Sheets

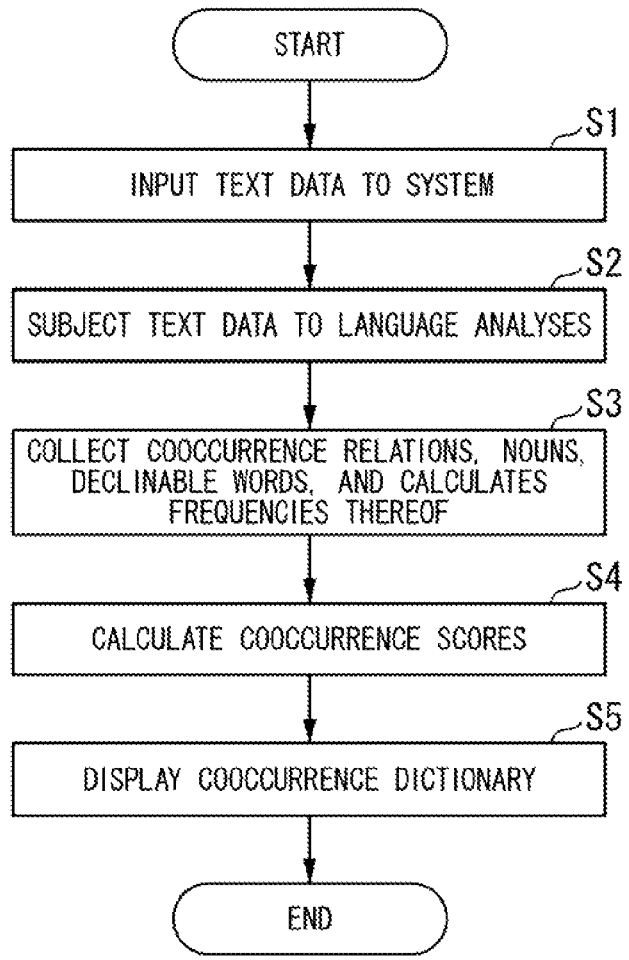

| ID | TEXT |
|---|---|
| 1 | KONO AMUSEMENT ZONE WA SEMAKU TE KURAKU TE TANOSHI SONA FUN-IKI DE KEKKO OMOSHIRO SO. (THIS AMUSEMENT ZONE IS NARROW AND DARK, AND LOOKS LIKE A FUN AND PRETTY INTERESTING PLACE.) |
| 2 | EDO JIDAI NO SHIRO RASHII GA, KOZO GA MUKASHI NO MAMA NA NO KA, MYONI KYUNA KAIDAN GA OOI. (THIS SEEMS TO BE A EDO ERA CASTLE AND HAS MANY STRANGELY STEEP STAIRS MAYBE BECAUSE IT RETAINS ITS STRUCTURE FROM THE OLD DAYS.) |
| 3 | ACCHI NO HO GA SCALE TEKI NI WA OKI KA NA (THAT ONE OVER THERE SEEMS TO BE LARGER IN SCALE.) |
| | ... |

FIG. 6

| WORDS 1 | WORDS 2 | FREQUENCIES |
|---|---|---|
| EDO JIDAI (EDO ERA) | SHIRO (CASTLE) | 30 |
| EDO JIDAI (EDO ERA) | KOZO (STRUCTURE) | 3 |
| EDO JIDAI (EDO ERA) | MUKASHI (OLD DAYS) | 21 |
| EDO JIDAI (EDO ERA) | KAIDAN (STAIRS) | 5 |
| ... | ... | ... |
| KAIDAN (STAIRS) | SHIRO (CASTLE) | 34 |
| KAIDAN (STAIRS) | KOZO (STRUCTURE) | 3 |
| KAIDAN (STAIRS) | MUKASHI (OLD DAYS) | 10 |
| ... | ... | ... |
| KOZO (STRUCTURE) | SHIRO (CASTLE) | 23 |
| KOZO (STRUCTURE) | MUKASHI (OLD DAYS) | 20 |
| ... | ... | ... |
| SHIRO (CASTLE) | MUKASHI (OLD DAYS) | 30 |
| KYUDA (STEEP) | MYODA (STRANGE) | 3 |
| ... | KYUDA (STEEP) | 20 |
| KAIDAN (STAIRS) | KAIDAN (STAIRS) | |
| OI (MANY) | | 15 |
| ... | ... | ... |

| WORDS | FREQUENCIES |
|---|---|
| EDO JIDAI (EDO ERA) | 66 |
| SHIRO (CASTLE) | 110 |
| KOZO (STRUCTURE) | 202 |
| MUKASHI (OLD DAYS) | 1002 |
| KAIDAN (STAIRS) | 445 |
| MYODA (STRANGE) | 150 |
| KYUDA (STEEP) | 330 |
| OI (MANY) | 601 |
| ... | ... |

FIG. 7

WORD 1: [EDO JIDAI (EDO ERA) ▼]  WORD 2: [DISPLAY ALL ▼]

COOCCURRENCE SCORE: EQUAL TO OR MORE THAN [0] EQUAL TO OR LESS THAN [1]

| WORDS 1 | WORDS 2 | COOCCURRENCE SCORES |
|---|---|---|
| EDO JIDAI (EDO ERA) | SHIRO (CASTLE) | 0.34 |
| EDO JIDAI (EDO ERA) | KOZO (STRUCTURE) | 0.02 |
| EDO JIDAI (EDO ERA) | MUKASHI (OLD DAYS) | 0.03 |
| EDO JIDAI (EDO ERA) | KAIDAN (STAIRS) | 0.02 |
| ... | ... | ... |

FIG. 12A

| ID | TEXT | | | INITIAL SCORES |
|---|---|---|---|---|
| | OBJECTS (NOUNS) | ATTRIBUTIONS (NOUNS) | EVALUATIONS (DECLINABLE WORDS) | |
| 1 | YUENCHI A (AMUSEMENT PARK A) | FUN-IKI (ATMOSPHERE) | TANOSHI (FUN) | 1 |
| 2 | YUENCHI A (AMUSEMENT PARK A) | ATTRACTION | KOWAI (SCARED) | 1 |
| 3 | YUENCHI A (AMUSEMENT PARK A) | KYAKU (CUSTOMERS) | OI (MANY) | 1 |
| 4 | YUENCHI A (AMUSEMENT PARK A) | FUN-IKI (ATMOSPHERE) | CHISAI (SMALL) | 1 |
| ... | ... | ... | ... | ... |

FIG. 12B

| ID | TEXT | INITIAL SCORES |
|---|---|---|
| 1 | YUENCHI A NI ITTA/ (I SAD TO THE AMUSEMENT PARK A) | 1 |
| 2 | YUENCHI A NI ITTA/ (I WENT TO THE AMUSEMENT PARK A) | 1 |
| 3 | YUENCHI A NI ITTA/ (SOMETHING IS NEEDED FOR THE AMUSEMENT PARK A) | 1 |
| 4 | YUENCHI A NI ITTA/ (SOMETHING IS ROASTED TO THE AMUSEMENT PARK A) | 1 |

FIG. 13

| WORDS 1 | WORDS 2 | COOCCURRENCE SCORES |
|---|---|---|
| YUENCHI A (AMUSEMENT PARK A) | FUN-IKI (ATMOSPHERE) | 20 |
| YUENCHI A (AMUSEMENT PARK A) | ATTRACTION | 100 |
| YUENCHI A (AMUSEMENT PARK A) | KYAKU (CUSTOMERS) | 150 |
| YUENCHI A (AMUSEMENT PARK A) | OI (MANY) | 0 |
| YUENCHI A (AMUSEMENT PARK A) | IKU (GO) | 300 |
| YUENCHI A (AMUSEMENT PARK A) | IU (SAY) | 10 |
| ... | ... | |
| SHIRO B (CASTLE B) | TEIEN (GARDEN) | 45 |
| SHIRO B (CASTLE B) | TENSHUKAKU (CASTLE TOWER) | 60 |
| ... | ... | ... |
| ATTRACTION | TANOSHI (FUN) | 100 |
| ATTRACTION | KOWAI (SCARED) | 250 |
| ... | ... | ... |
| FUN-IKI (ATMOSPHERE) | II (GOOD) | 100 |
| FUN-IKI (ATMOSPHERE) | TANOSHI (FUN) | 20 |
| ... | ... | ... |
| TENSHUKAKU (CASTLE TOWER) | SUGOI (GREAT) | 20 |
| ... | ... | ... |
| KYAKU (CUSTOMERS) | OI (MANY) | 200 |
| ... | ... | ... |

FIG. 14A

| ID | TEXT | | | TYPICALITY SCORES |
|---|---|---|---|---|
| | OBJECTS (NOUNS) | ATTRIBUTIONS (NOUNS) | EVALUATIONS (DECLINABLE WORDS) | |
| 1 | YUENCHI A (AMUSEMENT PARK A) | FUN-IKI (ATMOSPHERE) | TANOSHI (FUN) | 41 |
| 2 | YUENCHI A (AMUSEMENT PARK A) | ATTRACTION | KOWAI (SCARED) | 351 |
| 3 | YUENCHI A (AMUSEMENT PARK A) | KYAKU (CUSTOMERS) | OI (MANY) | 351 |
| 4 | YUENCHI A (AMUSEMENT PARK A) | FUN-IKI (ATMOSPHERE) | CHISAI (SMALL) | 21 |
| ... | ... | ... | ... | ... |

FIG. 14B

| ID | TEXT | TYPICALITY SCORES |
|---|---|---|
| 1 | YUENCHI A NI ITTA/ (I SAD TO THE AMUSEMENT PARK A) | 11 |
| 2 | YUENCHI A NI ITTA/ (I WENT TO THE AMUSEMENT PARK A) | 301 |
| 3 | YUENCHI A NI ITTA/ (SOMETHING IS NEEDED FOR THE AMUSEMENT PARK A) | 1 |
| 4 | YUENCHI A NI ITTA/ (SOMETHING IS ROASTED TO THE AMUSEMENT PARK A) | 1 |

COOCCURRENCE DICTIONARY CREATING SYSTEM, SCORING SYSTEM, COOCCURRENCE DICTIONARY CREATING METHOD, SCORING METHOD, AND PROGRAM THEREOF

This application is the National Phase of PCT/JP2009/056804, filed Apr. 1, 2009, which claims priority to Japanese Patent Application No. 2008-094980 filed on Apr. 1, 2008, and Japanese Patent Application No. 2008-124254 filed on May 12, 2008, the entire contents of which are hereby incorporated by reference.

TECHNICAL FIELD

The present invention relates to a cooccurrence dictionary creating system, a scoring system, a cooccurrence dictionary creating method, a scoring method, and a program thereof.

BACKGROUND ART

In recent years, various types of documents have been converted into electronic documents. It is important to effectively use various pieces of information written in the electronic documents. In order to effectively use the electronic documents, natural language processing techniques have attracted attention.

When the documents are processed semantically with natural language processing, cooccurrence word information is used in many cases.

For example, since it is considered that similar cooccurrence words are semantically similar to each other, the semantic similarity of two words is calculated to be higher when the cooccurrence words are more similar to each other. In addition, in hiragana-to-kanji conversion, a candidate from among conversion candidates is determined to be likely when it often cooccurs with a previously established word.

Examples of the conventional cooccurrence dictionary creating system are disclosed in Patent Document 1.

The cooccurrence dictionary creating system of Patent Document 1 includes a document analyzing section which analyzes a given document group, a word extracting section which extracts words existing in the given document group and causing a storage unit to store the extracted words, a word-chain extracting section which extracts word chains existing in the given document group and causing the storage unit to store the extracted word chains, a number-of-cooccurrences detecting section which detects the number of cooccurrences between each word and each word chain and causing the storage unit to store the number of cooccurrences, a concept information quantifying section which detects a cooccurrence degree in accordance with the number of cooccurrences, and for quantifying word concept information based on the detected cooccurrence degree and causing the storage unit to store the quantified concept information, and a concept information database creating section which makes a database of the word concept information which is obtained by the concept information quantifying section.

The above-mentioned "word chain" is a chain of n (n is two or more) words which are continuous in a document.

According to Patent Document 1, first of all, each sentence in a document group is subjected to a morpheme analysis. Then, all words or word chains (chains constituted by two or more words) are extracted from the result of the morpheme analysis and are stored in the storage unit. Subsequently, the number-of-cooccurrences detecting section extracts, from among the extracted independent words (nouns, pronouns, verbs, adjectives, adverbs) or word chains, cooccurring independent words or word chains and counts the number of appearances. The number-of-cooccurrences detecting section sends the counting result to the concept information quantifying section. Here, the number of appearances is counted when words or word chains cooccur in a predetermined document range. The "predetermined document range" is either a document, a paragraph, or a sentence. Then, the concept information quantifying section calculates the cooccurrence degree for each of the extracted words or word chains with each of the words or word chains based on the counting result by the number-of-cooccurrences detecting section. Here, the cooccurrence degree is a value obtained by dividing the number of cooccurrences by the number of appearances of one word, which constitutes the cooccurrence information, and normalizing the result.

The first problem of the conventional technique is that it is difficult to generate a high quality cooccurrence dictionary. This is because while the cooccurrence dictionary creating system disclosed in Patent Document 1 collects all the cooccurrences within a predetermined range such as a document, a paragraph, or a sentence, the collected cooccurrences include the ones without any semantic relationships in practice. Considering a case of obtaining cooccurrence information from a sentence "Curry Wa Karai Ga, Fukujinzuke Wa Shoppai. (these Japanese words mean 'the curry is spicy, and the pickles are salty')", for example, "Curry, Karai (this Japanese word means 'spicy')", "Curry, Fukujinzuke (this Japanese word means 'pickles')", "Fukujinzuke (this Japanese word means 'pickles'), Shoppai (this Japanese word means 'salty')", "Curry, Shoppai (this Japanese word means 'salty')", "Fukujinzuke (this Japanese word means 'pickles'), Karai (this Japanese word means 'spicy')", and the like are obtained as the cooccurrences according to the technique of Patent Document 1. Here, three type cooccurrences of "Curry, Karai (this Japanese word means 'spicy')", "Curry, Fukujinzuke (this Japanese word means 'pickles')", and "Fukujinzuke (this Japanese word means 'pickles'), Shoppai (this Japanese word means 'salty')" are semantically appropriate. However, although "Curry, Shoppai (this Japanese word means 'salty')", "Fukujinzuke (this Japanese word means 'pickles'), Karai (this Japanese word means 'spicy')" are grammatically appropriate, these expressions are not usually used. As described above, the cooccurrence dictionary creating system disclosed in Patent Document 1 collects a great number of cooccurrences with low semantic relationships. This tendency appears more markedly when the range for obtaining the cooccurrences becomes wider from a sentence to a paragraph to a document.

The second problem of the conventional technique is that a large storage region is required for storing cooccurrence information, and that the storage capacity of the cooccurrence dictionary becomes large. This is because in the cooccurrence dictionary creating system disclosed in Patent Document 1, as the number of words in a document group or the number n of the word chains for the expressions (referred to as a complex expression) constituted by complex words increases, the number of the types of the word chains increases. In order to store the cooccurrence degrees of the complex expressions, it is necessary to provide a region for storing a number of numerical values, which would be a square number of the types of the word chains, in the worst case. For example, it is assumed that 1000 words are used in the document group and n is 3. Then, the number of the types of the complex expressions becomes approximately one billion (=1000×1000×1000) in the worst case. That is, the cooccurrence dictionary creating system disclosed in Patent Document 1, which is configured to store all the cooccurrence degrees, requires a region for storing a numerical value that is the square number of one billion in its cooccurrence dictionary.

Patent Document 1: Japanese Unexamined Patent Publication, First Publication No. 2006-215850

Non-Patent Document 1: Akiko Aizawa, "Kyoki Ni Motozuku Ruijisei Syakudo (Cooccurrence-based Similarity Criteria)", Operation research as a management science research, vol. 52, No. 11, PP. 706-712, 2007

Non-Patent Document 2: T. Hofmann, "Probabilistic Latent Semantic indexing", Proc. of SIGIR '99, pp. 50-57, 1999

Non-Patent Document 3: M. A. Hearst, Text Tiling: Segmenting Text into Multiparagraph Subtopic Passages, Computational Linguistics, Vol. 23, No. 1, pp. 33-64, 1997

DISCLOSURE OF INVENTION

Problem to be Solved by the Invention

The present invention was made in view of the above problem, and the object thereof is to provide a cooccurrence dictionary creating system, a scoring system, a cooccurrence dictionary creating method, a scoring method, and a program thereof, which are capable of producing a cooccurrence dictionary while taking semantic relationships into consideration.

In addition, the object of the present invention is to provide a cooccurrence dictionary creating system, a scoring system, a cooccurrence dictionary creating method, a scoring method, and a program thereof, which are capable of producing a cooccurrence dictionary with a small storage region corresponding to complex expressions by extracting only the complex expressions with meaning.

Means for Solving the Problem

A cooccurrence dictionary creating system according to an aspect of the present invention includes a language analyzing section which subjects a text to a morpheme analysis, a clause specification, and a modification relationship analysis between clauses, a cooccurrence relationship collecting section which collects cooccurrences of nouns in each clause of the text, modification relationships of nouns and declinable words, and modification relationships between declinable words as cooccurrence relationships, a cooccurrence score calculating section which calculates a cooccurrence score of the cooccurrence relationship based on a frequency of the collected cooccurrence relationship, and a cooccurrence dictionary storage section which stores a cooccurrence dictionary in which a correspondence between the calculated cooccurrence score and the cooccurrence relationship is described.

According to the present invention, a unit constituting a cooccurrence relationship is defined as a clause. Accordingly, it is not necessary to distinguish a noun clause from a noun, and a declinable word clause from a declinable word, respectively. For this reason, the description will be made while omitting the expression "clause" in some cases. However, a word and not a clause will be meant only when specified with the expression "word".

Effect of the Invention

According to the present invention, it is possible to produce a cooccurrence dictionary while taking semantic relationships into consideration. This is because cooccurrence relationships relating to declinable words are limited only to modification relationships.

In addition, according to the present invention, a cooccurrence collection unit is set to be a clause. Therefore, it is possible to extract only the complex expressions with meaning. As a result, it is possible to produce a cooccurrence dictionary with a small storage region corresponding to the complex expressions.

BRIEF DESCRIPTION OF THE DRAWINGS

FIG. 2 is a flow chart illustrating operations of the first embodiment of the present invention.

FIG. 3 is an explanatory diagram illustrating an example of text data input by a corpus input section.

FIG. 6 is an explanatory diagram illustrating an example of an output result of the cooccurrence relationship collecting section.

FIG. 7 is an explanatory diagram illustrating a display example of a cooccurrence dictionary display section.

FIG. 12A is a diagram illustrating an example of extraction results of the information extracting unit.

FIG. 12B is a diagram illustrating an example of candidates for a hiragana-to-kanji conversion.

FIG. 13 is an explanatory diagram for data of a cooccurrence dictionary storage section, which is used for the explanation of the third embodiment of the present invention.

FIG. 14A is a diagram illustrating an example of typicality scores for information extraction results.

FIG. 14B is a diagram illustrating an example of typicality scores for hiragana-to-kanji conversion candidates.

Figure 1:
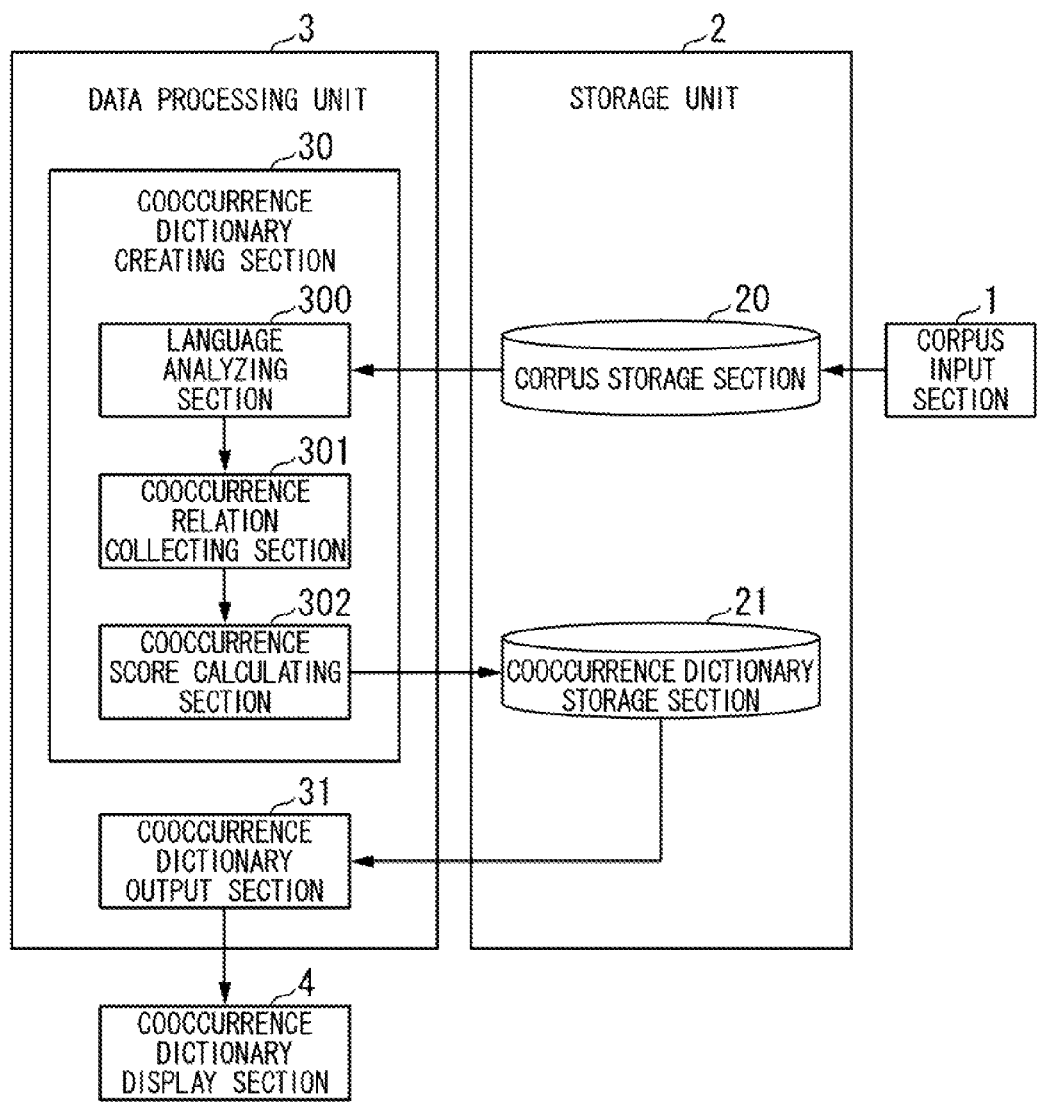
FIG. 1 is a block diagram illustrating a configuration of a first embodiment of the present invention.

REFERENCE SYMBOLS 1 corpus input section
2, 9, 10 storage unit
3, 5, 7, 11 data processing unit
8 text data display section
20 corpus storage section
21 cooccurrence dictionary storage section
22 text data storage section
23 storage section for text data with typicality score
30, 70 cooccurrence dictionary creating section
71 typicality scoring section
72 text data selecting section
300 language analyzing section
301 cooccurrence relationship collecting section 302 cooccurrence score calculating section
500 topic splitting section
3000 processor
3001 program memory
3002 storage medium

BEST MODE FOR CARRYING OUT THE INVENTION (First Embodiment)

The detailed description will be made of a first embodiment for implementing the present invention with reference to accompanying drawings.

FIG. 1 is a block diagram illustrating a configuration of the first embodiment of the present invention.

According to the first embodiment of the present invention, the configuration includes a corpus input section 1 which inputs a text as a collection source of cooccurrence relationships, a storage unit 2 which stores the text and a created cooccurrence dictionary, a data processing unit 3 operated by a program control, and a cooccurrence dictionary display section 4 which displays the content of the created cooccurrence dictionary.

Each of the corpus input section 1, the storage unit 2, the data processing unit 3, and the cooccurrence dictionary display section 4 will be described.

The corpus input section 1 causes a corpus storage section 20 to store the text data as a collection source of the cooccurrence relationships. The corpus is constituted by a "text" which represents a text main body and an "ID" which represents an identifier for the respective pieces of data. The "ID" may be designated in advance, or may be automatically given. For example, IDs of sequential integer numbers may be given to the respective pieces of data in the input order thereof.

The storage unit 2 includes a corpus storage section 20 and a cooccurrence dictionary storage section 21.

The corpus storage section 20 stores the text date input by the corpus input section 1.

The cooccurrence dictionary storage section 21 stores a cooccurrence dictionary created by a cooccurrence dictionary creating section 30.

The data processing unit 3 includes the cooccurrence dictionary creating section 30 and a cooccurrence dictionary output section 31.

The cooccurrence dictionary creating section 30 includes a language analyzing section 300, a cooccurrence relationship collecting section 301, and a cooccurrence score calculating section 302.

The language analyzing section 300 reads the text data from the corpus storage section 20, performs a morpheme analysis, a clause specification, and a modification relationship analysis between clauses for each piece of the text data. The language analyzing section 300 outputs the analysis results to the cooccurrence relationship collecting section 301.

The cooccurrence relationship collecting section 301 collects nouns, declinable words, cooccurrence relationships between nouns, cooccurrence relationships in each of which a noun is in a modification relationship with a declinable word, and cooccurrence relationships in each of which a declinable word is in a modification relationship with another declinable word from the analysis results of the language analyzing section 300. In addition, the cooccurrence relationship collecting section 301 obtains the frequencies of the nouns, declinable words, and the respective cooccurrence relationships. The cooccurrence relationship collecting section 301 outputs the collected cooccurrence relationships and the obtained frequencies of the cooccurrence relationships to the cooccurrence score calculating section 302. Here, the cooccurrence relationships between nouns are collected only when each of the nouns cooccurs in a predetermined document range. The predetermined document range is either a document, a paragraph, or a sentence.

The cooccurrence score calculating section 302 receives the respective nouns, the declinable words, the cooccurrence relationships, and the frequencies thereof, and then calculates a cooccurrence score for the respective cooccurrence relationships. Thereafter, the cooccurrence score calculating section 302 causes the cooccurrence dictionary storage section 21 to store the respective cooccurrence relationships and the calculated cooccurrence scores. The cooccurrence score indicates the degree in which two words are used at a same time, and is calculated so as to be higher when two words are used at a same time more frequently. It is possible to use an arbitrary cooccurrence intensity calculating method for the cooccurrence scores. In addition, logarithms of the frequencies may be taken as the cooccurrence score so as not to allow a cooccurrence relationship with a high frequency to be too advantageous.

In addition, it is considered that two words in a relationship, in which the two words unevenly cooccur, have a deep semantic relationship. Accordingly, it is applicable to use as the cooccurrence score a value obtained by dividing a frequency of a cooccurrence relationship by a frequency of one of the two words in the cooccurrence relationship, or by the sum of the frequencies of both of the two words.

In addition, the semantic relationship is stronger for words which are semantically easy to be used at the same time, and weaker for words which are rarely used at the same time.

It is also applicable to use a Dice coefficient, self-mutual information, a Jaccard coefficient, and the like which are the criteria for the cooccurrence intensities in Non-Patent Document 1. For example, the Dice coefficient disclosed in Non-Patent Document 1 is calculated so as to satisfy a formula "Dice coefficient=$2 \times f12/(f1+f2)$" when it is assumed that f12 represents a frequency of a cooccurrence relationship and that f1 and f2 represent the frequencies of two words constituting the cooccurrence relationship.

As disclosed in Non-Patent Document 2, it is also applicable to use a method of estimating a cooccurrence ratio of two arbitrary words from a group of cooccurrence relationships. In Non-Patent Document 2, $P(w\_i|w\_j)$ is calculated by estimating $P(w\_i|z\_k)$, $P(w\_j|z\_k)$ and $P(z\_k)$ while assuming that a cooccurrence ratio of two words $w\_i$ and $w\_j$ ($0 \leq i$, $j \leq n$, $i \neq j$) satisfies "$P(w\_i|w\_j) = \Sigma P(w\_i|z\_k) P(w\_j|z\_k) P(z\_k)$" from the group of the cooccurrence relationships. Here, n represents the number of the types of the words constituting the cooccurrence relationship. k in $z\_k$ represents an index. $\Sigma$ represents an operator taking the sum of all k. $z\_k$ represents a cluster in which cooccurrence words with similar distributions are collected. The number of k is designated by a user. $P(z\_k)$ represents an appearance ratio of the respective clusters. $P(w\_i|z\_k)$ represents a creation ratio of $w\_i$ when a cluster $z\_k$ appears. $P(w\_j|z\_k)$ represents a creation ratio of $w\_j$ when a cluster $z\_k$ appears. In Non-Patent Document 2, the more similar the distributions of the cooccurrence words are, the higher $P(w\_i|z\_k)$ and $P(w\_j|z\_k)$ become at the same time. Accordingly, the cooccurrence ratio is calculated so as to be higher for two words with higher ratios in which they are created from the same cluster. That is, according to Non-Patent Document 2, the cooccurrence ratio is appropriately calculated from the similarity of the distributions of the cooccurrence words for each word. For this reason, it is possible to calculate the cooccurrence score for the cooccurrence relationship which may naturally cooccur but does not cooccur in the document by accident.

The cooccurrence dictionary output section 31 reads the cooccurrence relationships described in the cooccurrence dictionary and the cooccurrence scores thereof from the cooccurrence dictionary storage section 21, and outputs the cooccurrence relationships and the cooccurrence scores to the cooccurrence dictionary display section 4. The cooccurrence dictionary output section 31 may output the cooccurrence relationships after sorting them in order from the lower cooccurrence score or in order from the higher cooccurrence score. The cooccurrence dictionary output section 31 may designate at least one word to output only the cooccurrence relationship including the input word. In addition, the cooccurrence dictionary output section 31 may output only the cooccurrence relationships with cooccurrence scores of not less than a predetermined level, cooccurrence relationships with cooccurrence scores of not more than a predetermined level, or cooccurrence relationships with cooccurrence scores of not less than a predetermined level and not more than a predetermined level.

The cooccurrence dictionary display section 4 displays the cooccurrence relationships output from the cooccurrence dictionary output section 31 along with the cooccurrence scores thereof.

In this embodiment, the cooccurrence collection unit for the cooccurrence dictionary creating section 30 is set as a clause which is a minimum unit of a meaning in a sentence. The cooccurrence dictionary creating section 30 limits the cooccurrence of a noun and a declinable word and the cooccurrence between declinable words only to the modification relationships. Accordingly, it is possible to reduce the collection amount of the cooccurrence relationships without any semantic relationships, and to thereby produce a cooccurrence dictionary with a high quality and a low capacity.

Next, the overall operations of this embodiment will be described in detail with reference to FIG. 1 and the flow chart of FIG. 2.

First, the corpus input section 1 causes the corpus storage section 20 to store the text data as a collection source of the cooccurrence relationships (step S1 in FIG. 2). FIG. 3 shows an example of data stored in the corpus storage section 20. FIG. 3 includes three pieces of document data. For example, the text data with the ID of 1 is "Kono Amusement Zone Wa Semaku Te Kuraku Te Tanoshi Sona Fun-iki De Kekko Omoshiro so. (these Japanese words mean 'this amusement zone is narrow and dark, but looks like a fun and pretty interesting place.')"

Then, the language analyzing section 300 reads the text data from the corpus storage section 20, and performs a morpheme analysis, a clause specification, and a modification relationship analysis between clauses (step S2 in FIG. 2). The specific description will be made with reference to FIG. 4.

Figure 4:
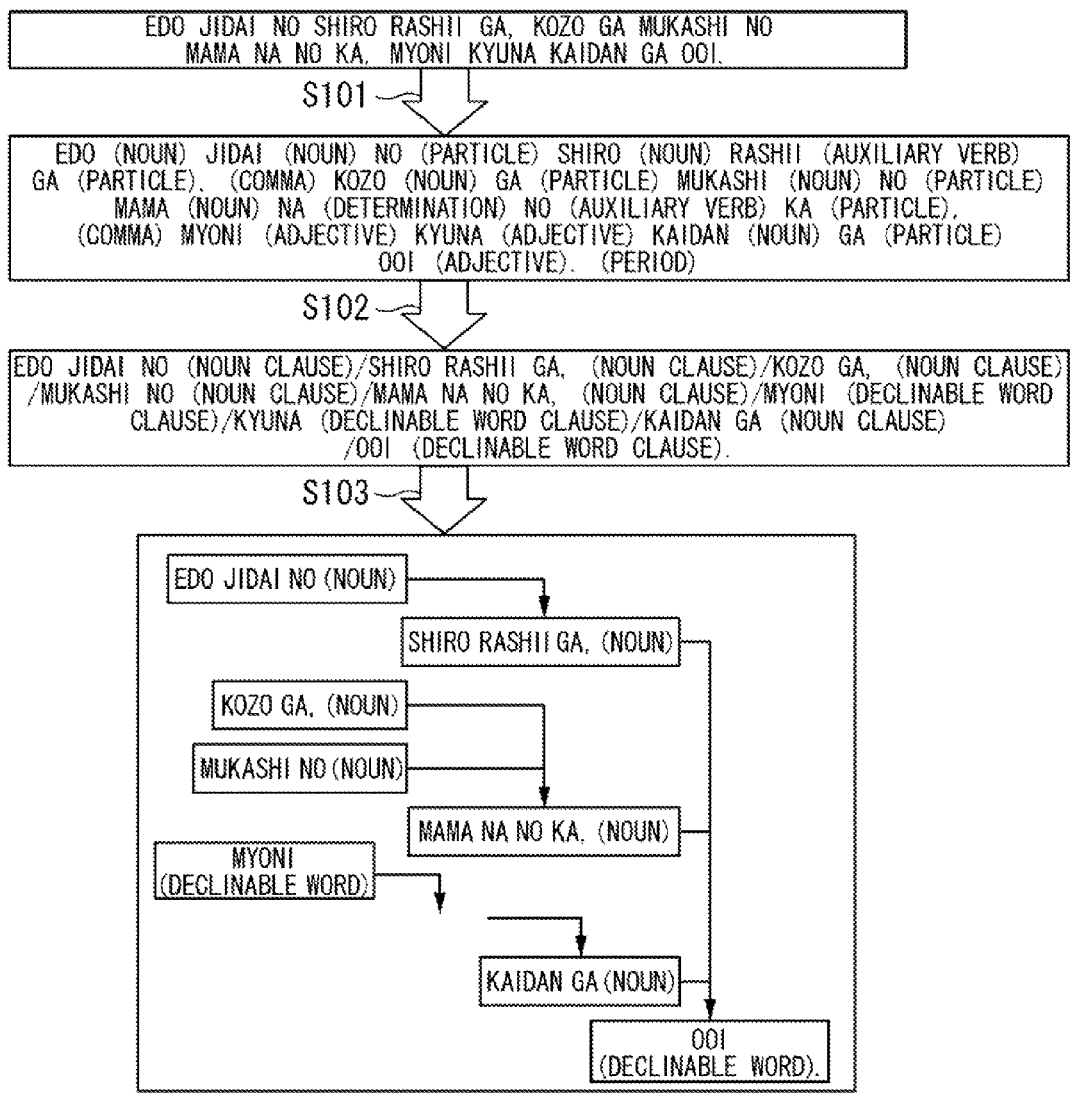
FIG. 4 is an explanatory diagram illustrating an analysis example of a language analyzing section.

FIG. 4 shows the result of subjecting the text with the ID of 2 in FIG. 3, which is the text "Edo Jidai No Shiro Rashii Ga, Kozo Ga Mukashi No Mama Na No Ka, Myoni Kyuna Kaidan Ga Ooi (these Japanese words mean 'this seems to be an Edo era castle and has many strangely steep stairs possibly because it retains its structure from the old days').''

The language analyzing section 300 performs a morpheme analysis (step S101). This processing of step S101 is also referred to as a morpheme analysis.

Then, the language analyzing section 300 organizes the results of the morpheme analysis to each clause unit, and specifies whether each of the clauses is a noun clause or a declinable word clause (step S102). This processing of step S102 is also referred to as a clause specification. Here, it is determined whether each of the clauses is a noun clause or a declinable word clause by the type of the word class of the independent word which is found first after searching a morpheme from the end of a clause. If a noun is found first, it is determined to be a noun clause. If a declinable word is found first, it is determined to be a declinable word clause.

At last, modification relationships between clauses are analyzed (step S103). This processing of step S103 is also referred to as a modification relationship analysis.

In the drawing illustrating the processing result of step S103 (the diagram in the bottom part in FIG. 4), the modification relationships are represented by arrows. For example, "Edo Jidai No" (these Japanese words mean 'Edo era') modifies "Shiro Rashii Ga" (these Japanese words mean 'seems to be a castle'), and "Kaidan Ga" (these Japanese words mean 'stairs') modifies "Ooi (this Japanese word means 'many')".

Returning to the explanation of FIG. 2, the cooccurrence relationship collecting section 301 collects the cooccurrence relationships, nouns, and declinable words from the analysis result by the language analyzing section 300, and calculates the frequencies thereof (step S3 in FIG. 2). The cooccurrence relationship collecting section 301 records the collected cooccurrence relationships, nouns, and declinable words and the calculated frequencies.

Figure 5:
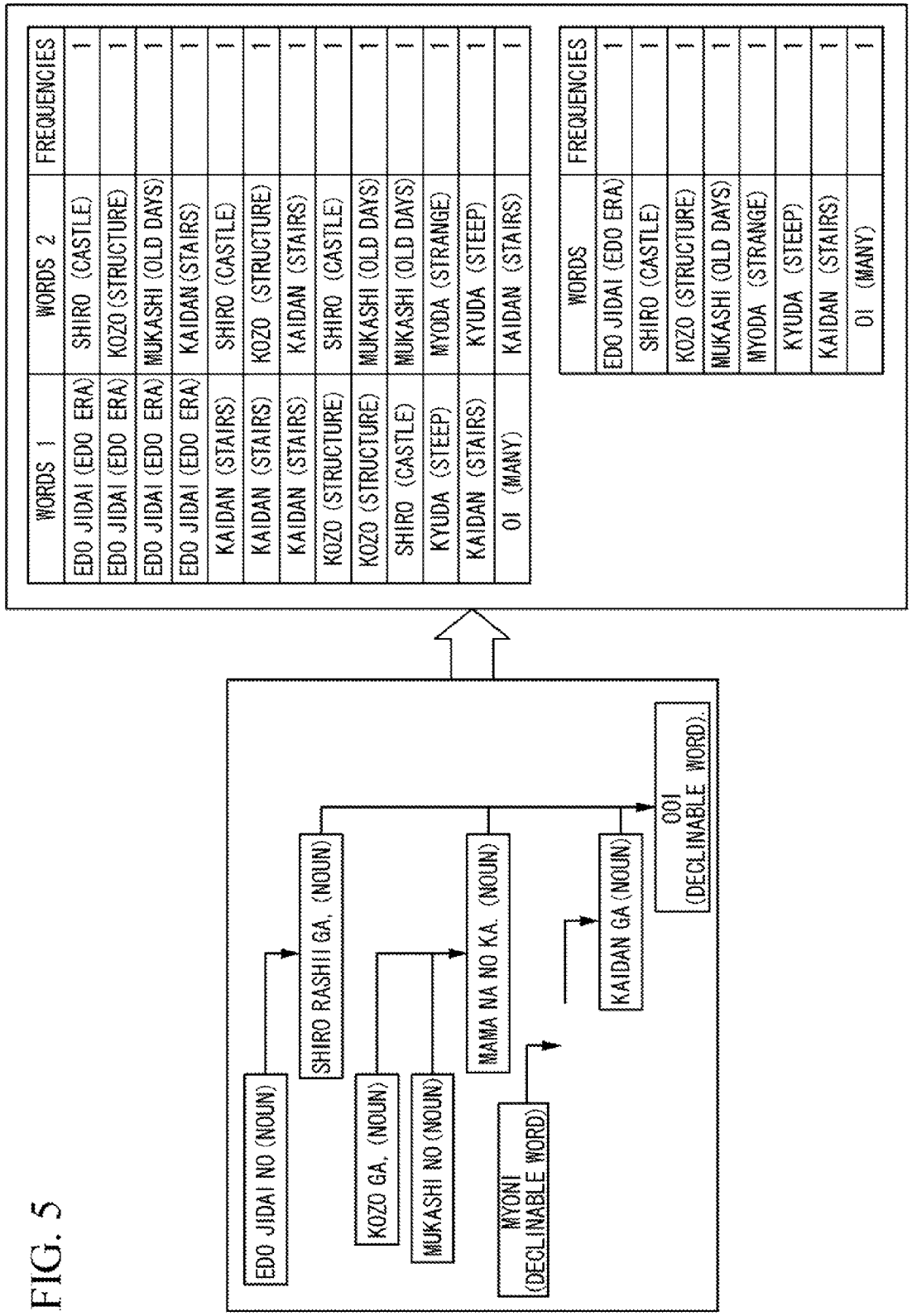
FIG. 5 is an explanatory diagram illustrating a processing example of a cooccurrence relationship collecting section.

FIG. 5 shows an example in which the nouns, the declinable words, and the cooccurrence relationships from the result of FIG. 4. The cooccurrence relationship collecting section 301 excludes attached words from the clauses when collecting the cooccurrence relationships. For example, since "No" in "Edo Jidai No" is a particle, the cooccurrence relationship collecting section 301 collects the clause as "Edo Jidai".

In addition, the declinable words are changed to root forms from the results of the morpheme analysis. For example, "Myoni" is changed to "Myoda". After such processing, cooccurrences between nouns, modification relationships between nouns and declinable words, and modification relationships between declinable words are collected, and the frequencies are counted.

Moreover, frequencies of just the nouns and just the declinable words are also recorded when these frequencies are necessary for the calculation of the cooccurrence scores. Here, directions are not fixed for the cooccurrence relationships in the embodiments of the present invention. That is, a cooccurrence relationship constituted by the same words is counted as one type by determining the order relationships of the two words with a size of value of a character code.

Returning to the explanation of FIG. 2, the cooccurrence score calculating section 302 calculates the cooccurrence score representing the cooccurrence intensity of the respective cooccurrence relationships based on the results collected by the cooccurrence relationship collecting section 301 (S4 in FIG. 2). Then, the cooccurrence score calculating section 302 causes the cooccurrence dictionary storage unit 21 to store the cooccurrence relationships and the cooccurrence scores.

FIG. 6 shows an example of an output result of the cooccurrence relationship collecting section 301. The operations of the cooccurrence score calculating section 302 will be described while exemplifying data shown in FIG. 6. In this example, the Dice coefficient is employed as a method for calculating the cooccurrence scores. Specifically, in the data shown in FIG. 6, the Dice coefficient of "Edo Jidai, Shiro" can be calculated such that $2\times30/(66+110) \approx 0.34$ since the frequency of "Edo Jidai, Shiro" is 30, the frequency of "Edo Jidai" is 66, and the frequency of "Shiro" is 110. The cooccurrence score calculating section 302 performs the same processing for all of the cooccurrence relationships. The cooccurrence score calculating section 302 makes corresponding relationships between the two words constituting the cooccurrence relationship and the calculated cooccurrence score, and causes the cooccurrence dictionary storage section 21 to store the two words and the cooccurrence score.

Returning to the explanation of FIG. 2, the cooccurrence dictionary display section 4 displays the data of the cooccurrence dictionary read from the cooccurrence dictionary storage section 21 by the cooccurrence dictionary output section 31 (step S5 in FIG. 2).

FIG. 7 shows a display example of the data stored in the cooccurrence dictionary storage section 21. In FIG. 7, all of the cooccurrence relationships including "Edo Jidai" are displayed. It is found that the cooccurrence score of "Edo Jidai, Shiro" is 0.34 when referring to FIG. 7. In addition, it is found that "Edo Jidai, Shiro" has a stronger semantic relationship when comparing "Edo Jidai, Shiro" with "Edo Jidai, Kozo".

Next, the description will be made of the effects of this embodiment.

In this embodiment, the language analyzing section 300 performs the morpheme analysis, the clause specification, and the modification relationship analysis between clauses. Then, the cooccurrence relationship collecting section 301 collects the respective pieces of data regarding the cooccurrences of noun clauses, modification relationships between noun clauses and declinable word clauses, and modification relationships between declinable word clauses. Thereafter, the cooccurrence score calculating section 302 calculates the cooccurrence scores of the cooccurrence relationships based on the frequencies of the collected cooccurrence relationships. As a result, the cooccurrence relationships relating to the declinable words are limited only to the modification relationships. Accordingly, it is possible to create the cooccurrence dictionary from the cooccurrence relationships with strong semantic relationships.

For example, when cooccurrence words are simply collected from a sentence "Curry Wa Karai Ga, Fukujinzuke Wa Shoppai. (these Japanese words mean 'the curry is spicy, and the pickles are salty')", cooccurrence relationships with weak semantic relationships such as "Curry, Shoppai (this Japanese word means 'salty')", "Fukujinzuke (this Japanese word means 'pickles'), Karai (this Japanese word means 'spicy')", and the like are also collected. On the other hand, when the cooccurrences of nouns and declinable words are limited only to the modification relationships, only ones with strong semantic relationships such as "Curry, Karai (this Japanese word means 'spicy')", "Fukujinzuke (this Japanese word means 'pickles'), Shoppai (this Japanese word means 'salty')" are collected. Here, the cooccurrences between nouns have semantic relationships in many cases even when the nouns are not in the modification relationships. Accordingly, the cooccurrences between nouns are not limited only to the modification relationships.

According to this embodiment, since the cooccurrence collection unit is set to a clause, there are no cooccurrence relationships with weak semantic relationships. As a result, it is possible to create the cooccurrence dictionary with a small storage region. A clause means "the one which is obtained by splitting a sentence into pieces which are as small as possible within a range in which the meaning thereof are understandable" which is similar to a general definition thereof. When the collection unit is set to a clause, the complex expressions, each of which does not constitute a unit of meaning, can be excluded. Accordingly, it is possible to reduce the size of storage capacity of the cooccurrence dictionary by the corresponding amount. In addition, when the cooccurrences are collected in units of meaning, the cooccurrence relationships which do not reflect the meaning of the sentence are not collected. Accordingly, it is possible to reduce the size of storage region, and create the cooccurrence dictionary with a high quality.

For example, when "Kensaku Engine Wa Kosoku Ni Keyword Wo Fukumu Bunsho Wo Sagasu Koto Ga Dekiru (these Japanese words mean 'search engines make it possible to search documents including keywords at a high speed')" is subjected to morpheme analysis, "Kensaku/Engine/Wa/Kosoku/Ni/Keyword/Wo/Fukumu/Bunsho/Wo/Sagasu/Koto/Ga/Dekiru" is obtained. Here, the descriptions of the word classes are omitted.

On the other hand, the clauses in the sentence are as follows: "Kensaku Engine Wa/Kosoku Ni/Keyword Wo/Fukumu/Busnho Wo/Sagasu/Koto Ga/Dekiru". When word chains are taken as a basic unit, complex expressions without any meaning such as "Wa Kosoku", "Fukumu Busho" and the like are also collected.

In addition, when words are taken as collection units, cooccurrences with weak semantic relationships such as "Engine, Bunsho" and "Engine, Keywords" are collected. On the other hand, when clauses are taken as collection units, cooccurrence relationships, which appropriately reflect the meaning of the sentence, such as "Kensaku Engine, Bunsho", "Kensaku Engine, Keyword" and the like can be collected.

(Second Embodiment)

Next, the detailed description will be made of a second embodiment of the present invention with reference to accompanying drawings.

Figure 8:
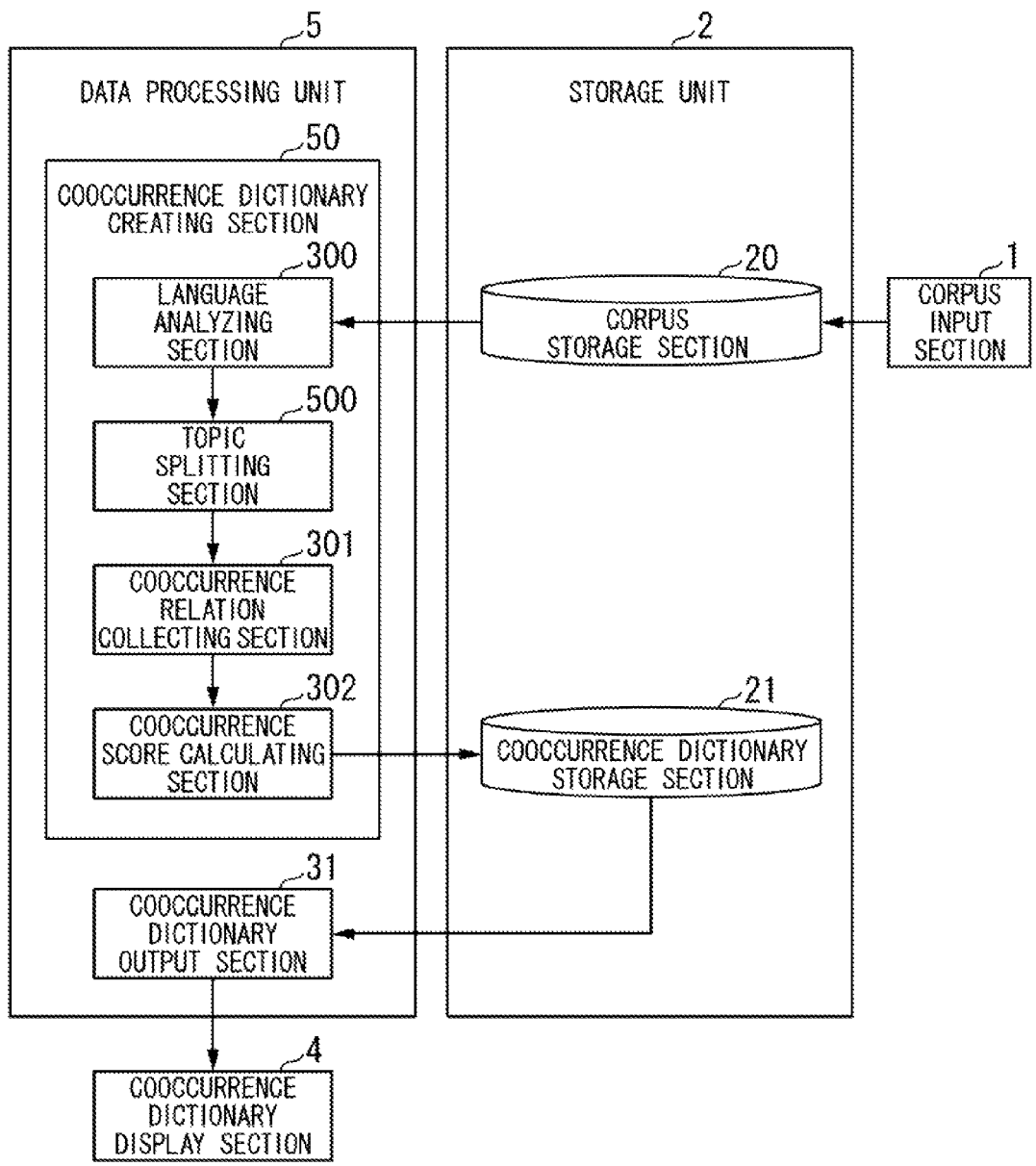
FIG. 8 is a block diagram illustrating a configuration of a second embodiment of the present invention.

FIG. 8 is a block diagram illustrating a configuration of the second embodiment of the present invention.

The second embodiment of the present invention is different from the first embodiment (FIG. 1) in that the configuration of the second embodiment is provided with a data processing unit 5 instead of the data processing unit 3. The data processing unit 5 is different from the data processing unit 3 in that the data processing unit 5 is provided with a cooccurrence dictionary creating section 50 instead of the cooccurrence dictionary creating section 30. The cooccurrence dictionary creating section 50 is different from the cooccurrence dictionary creating section 30 in that the cooccurrence dictionary creating section 50 is further provided with a topic splitting section 500 in addition to the language analyzing section 300, the cooccurrence relationship collecting section 301, and the cooccurrence score calculating section 302.

The language analyzing section 300 reads the text data from the corpus storage section 20, and performs a morpheme analysis, a clause specification, and a modification relationship analysis between clauses for each pieces of the text data. Thereafter, the language analyzing section 300 outputs the analysis results to the topic splitting section 500.

The topic splitting section 500 detects changing points of topics in the respective text data from the analysis result of the language analyzing section 300. Then, the topic splitting section 500 splits the original analysis result at the respective changing points, and outputs the split analysis result to the cooccurrence relationship collecting section 301. Since the cooccurrence relationships between nouns in different topics have weak semantic relationships, the topic splitting section 500 splits the cooccurrence relationships for each topic and outputs the split results to the cooccurrence relationship collecting section 301 at a later stage. As a result, it is possible to collect the cooccurrence relationships with stronger semantic relationships.

There is an example of a text "Kino Nikkei Heikin Ga Boraku Shi Te Ita Ga, Kaigai Toshika No Eikyo De Arou Ka.

Nanka, Hara Ga Hette Kita. Konbini Itte Ko Yo. (these Japanese words mean 'the Nikkei average plunged yesterday possibly because of the influence of overseas investors. I feel like I am getting hungry. Let's go to the convenience store.')" In this text, the topic is changed at the point of "Nanka, Hara Ga Hette Kita. (these Japanese words mean 'I feel like I am getting hungry.')" Accordingly, it is understood that the words "Nikkei Heikin (these Japanese words mean 'Nikkei average'), Konbini (this Japanese word means 'convenience store')" cooccur by accident. On the other hand, when the two words cooccur in the same topic, for example, in a sentence like "The business climate for the convenience store industry is in a good condition, and Nikkei average is rising", two words cooccur not by accident but with a relationship. That is, it is possible to reduce the accidental cooccurrence relationships by collecting the cooccurrence relationships from the same topics. For this reason, it is possible to create the cooccurrence dictionary with a higher quality.

The topic splitting section 500 can use any arbitrary method which can split the topics based on the results of the morpheme analysis, the clause specification, and the modification relationship analysis. For example, when n or more type of nouns, which are used in the sentences before a point, do not occur in the following sentences after the point, the topic splitting section 500 may split the topics. This is based on an assumption that words representing the same contents should be used if the same topic continues. In the above-mentioned text, there is no same noun between the sentence "Kino Nikkei Heikin Ga Boraku Shi Te Ita Ga, Kaigai Toshika No Eikyo De Arou Ka. (these Japanese words mean 'the Nikkei average plunged yesterday possibly because of the influence of overseas investors.')" and the sentence "Nanka, Hara Ga Hette Kita. (these Japanese words mean 'I feel like I am getting hungry.')

Accordingly, it is possible to think that there has been a change of topic. In addition, the topic splitting section 500 may split the topics when expressions indicating the changes of the topics appear. "Hanashi Wa Kawaru Ga (these Japanese words mean 'let us move on to another topic'), "Tokorode (this Japanese word means 'by the way')", "Totsuzen De Aruga (these Japanese words mean 'it is sudden, but')" and the like can be exemplified as the expressions indicating the change of topic. Moreover, the topic splitting section 500 may split the topics when there is no conjunction at the beginnings of the sentences. This is because it is considered that two sequential sentences have a relationship when there is a conjunction between them, and on the other hand, that each of the two sequential sentences belongs to a different topic when there is no conjunction between them. Furthermore, it is possible to use the technique in Non-Patent Document 3 for the topic splitting section 500. According to Non-Patent Document 3, word columns are regarded as pseudo-paragraphs, and overlapping words in two adjacent pseudo-paragraphs are measured. Then, a position where there is less overlapping is regarded as a topic changing point, and the topics are split at the topic changing point.

The cooccurrence relationship collecting section 301 has the same functions as those of the cooccurrence relationship collecting section 301 in the first embodiment except that it collects the cooccurrence relationships for each analysis result split at the topic changing points.

The other configurations are the same as those in the first embodiments.

Next, overall operations of this embodiment will be described in detail with reference to FIG. 8 and a flow chart of FIG. 9.

Figure 9:
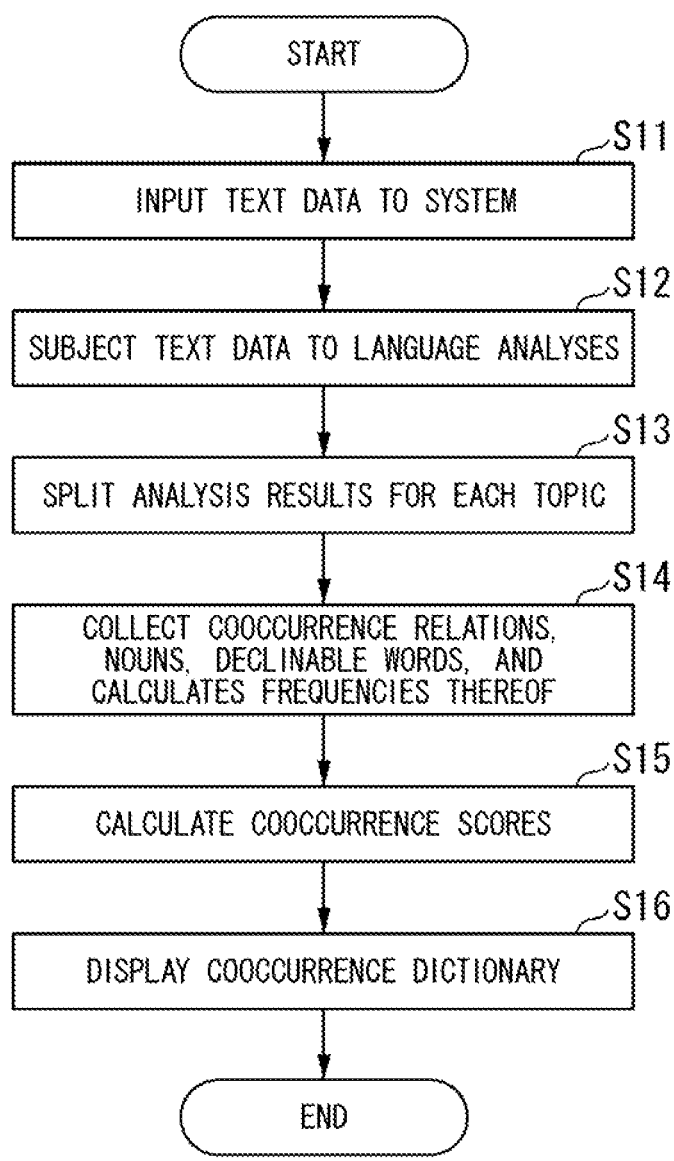
FIG. 9 is a flow chart illustrating operations of the second embodiment of the present invention.

Since steps S11 and S12 in FIG. 9 are the same as steps S1 and S2 in FIG. 2, the description thereof will be omitted.

The topic splitting section 500 receives the analysis results by the language analyzing section 300, and detects the topic changing points in the text. Then the topic splitting section 500 splits the analysis results based on the detected changing points (step S13 in FIG. 9), and outputs the split analysis results to the cooccurrence relationship collecting section 301.

In this example, the topic splitting section 500 splits the topics when two types or more nouns do not overlap in two sequential sentences. For example, the following description will be made while exemplifying a text "1) Saikin Toshi Ni Kyomi Ga Dete Kita Tame Nikkei Heikin Wo Check Suru Yoni Natta. (these Japanese words mean 'I have started to check the Nikkei average since I recently became interested in investment.') 2) Kino Nikkei Heikin Ga Boraku Shi Te Ita Ga, Kaigai Toshika No Eikyo De Arou Ka. (these Japanese words mean 'the Nikkei average plunged yesterday possibly because of the influence of overseas investors.') 3) Nanka, Hara Ga Hette Kita. (these Japanese words mean 'I feel like I am getting hungry.') 4) Konbini Itte Ko Yo. (these Japanese words mean 'let's go to the convenience store.')" In addition, the numbers 1) to 4) are given to the sentences, respectively, for the explanation, and these numbers are not actually written in the text.

The topic splitting section 500 counts the number of types of overlapping nouns in adjacent two sentences, and splits the topics between the sentences where two or more types of nouns do not overlap. The nouns in the respective sentences can be extracted from the output of the language analyzing section 300. As a result, three types of nouns "Toshi, Nikkei, Heikin" overlap in the sentences 1) and 2). In addition, there are no overlapping nouns in the sentences 2) and 3). Moreover, there are no overlapping nouns in the sentences 3) and 4). Accordingly, the topic splitting section 500 splits the text into three parts of "Saikin Toshi Ni Kyomi Ga Dete Kita Tame Nikkei Heikin Wo Check Suru Yoni Natta. Kino Nikkei Heikin Ga Boraku Shi Te Ita Ga, Kaigai Toshika No Eikyo De Arou Ka. (these Japanese words mean 'I have started to check the Nikkei average since I recently became interested in investment. The Nikkei average plunged yesterday possibly because of the influence of overseas investors.')", "Nanka, Hara Ga Hette Kita. (these Japanese words mean 'I feel like I am getting hungry.')", and "Konbini Itte Ko Yo. (these Japanese words mean 'let's go to the convenience store.')"

Since steps S14 to S16 in FIG. 9 are the same as steps S3 to S5 in FIG. 1, the description thereof will be omitted.

Next, the effects of this embodiment will be described.

This embodiment has the following effects in addition to the effects of the first embodiment. That is, it is possible to collect the cooccurrences between nouns only from the same topics by providing the topic splitting section 500. Accordingly, it is possible to create the cooccurrence dictionary while limiting the target only to the cooccurrence relationships with stronger semantic relationships. In addition, the cooccurrences of the nouns and the declinable words and the cooccurrences between the declinable words are naturally limited to the modification relationships of the nouns and the declinable words and the modification relationships between declinable words in the sentences. For this reason, it is possible to collect the cooccurrence relationships with stronger semantic relationships regardless of whether the topics are split.

(Third Embodiment)

Next, the detailed description will be made of a third embodiment of the present invention with reference to accompanying drawings.

Figure 10:
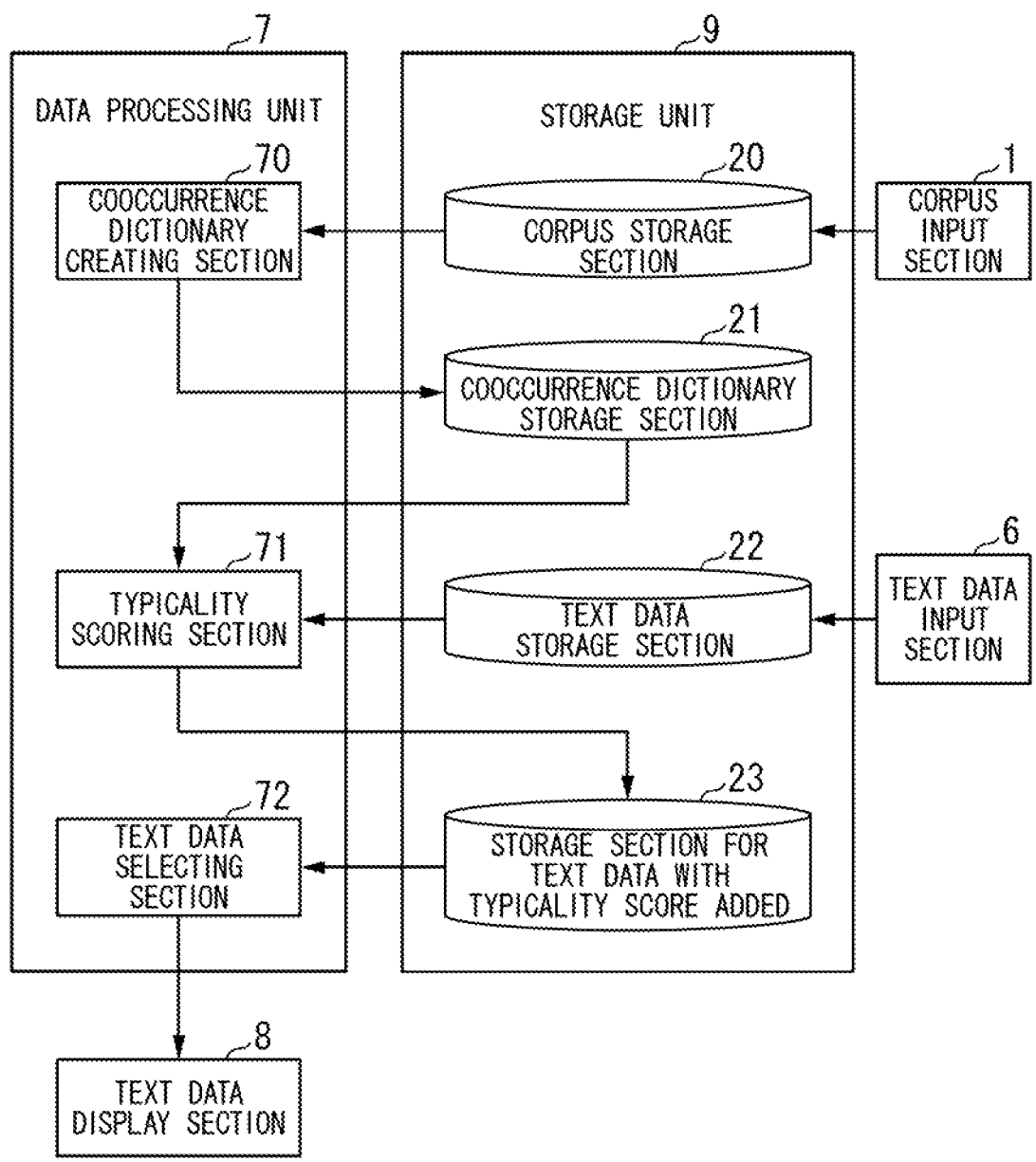
FIG. 10 is a block diagram illustrating a configuration of a third embodiment of the present invention.

FIG. 10 is a block diagram illustrating a configuration of the third embodiment of the present invention.

The third embodiment of the present invention is different from the first embodiment (FIG. 1) in that the configuration of the third embodiment includes a storage unit 9, a data processing unit 7, and a text data display section 8 instead of the storage unit 2, the data processing unit 3, and the cooccurrence dictionary display section 4. In addition, the third embodiment is different from the first embodiment in that the configuration of the third embodiment includes a text data input section 6.

The storage unit 9 is different from the storage unit 2 in that the storage unit 9 further includes a text data storage section 22 and a storage section 23 for text data with typicality score in addition to the corpus storage section 20 and the cooccurrence dictionary storage section 21.

The data processing unit 7 is different from the data processing unit 3 in that the data processing unit 7 includes a cooccurrence dictionary creating section 70, a typicality scoring section 71, and a text data selecting section 72 instead of the cooccurrence dictionary creating section 30 and the cooccurrence dictionary output section 31.

The cooccurrence dictionary creating section 70 creates the cooccurrence dictionary based on the text, which is stored in the corpus storage section 20 by the corpus input section 1, as a collection source of the cooccurrence relationships, and causes the cooccurrence dictionary storage section 21 to store the created cooccurrence dictionary. The cooccurrence dictionary creating section 70 has the same configuration as that of the cooccurrence dictionary creating section 30 or the same configuration as that of the cooccurrence dictionary creating section 50 in the second embodiment.

The text data input section 6 causes the text data storage section 22 to store the text data as a target to which the typicality is given by the cooccurrence dictionary. The text data includes a "text" representing the text main body, an "ID" representing an identifier of the respective pieces of the data, and an "initial score" which is set typicality score designated in advance.

The "IDs" may be designated in advance, or IDs of sequential integer numbers may be automatically given in the input order thereof. In addition, the "text" may be a document, or may be a relationship constituted by a plurality of words extracted by some method.

The larger the value of the "initial score" is, the higher the evaluation is. In addition, when there is no need to give the "initial scores", or when the "initial scores" are not given, a same value such as 0, 1, or the like is used for all the text. In addition, the text data input section 6 may be configured to automatically input the output from the other natural language processing systems, such as the hiragana-to-kanji conversion candidates, the information search results, information extraction results, and the like, and the "initial score" may be the score of the respective systems. For example, as the "initial scores", the scores of the hiragana-to-kanji conversion candidates, the reliability of the information extraction results, which is given by the information extracting unit, the degrees of fitness of the search engines, the inverse numbers of the orders, or the like can be considered.

The typicality scoring section 71 reads the text data stored in the text data storage section 22 and the cooccurrence dictionary data stored in the cooccurrence dictionary storage section 21. Then, the typicality scoring section 71 extracts the cooccurrence relationships from the respective pieces of the text data, and calculates the typicality scores for the respective pieces of the text data from the initial scores and the cooccurrence scores of the cooccurrence relationships of the respective pieces of the text data. Thereafter, the typicality scoring section 71 causes the storage section 23 for text data with typicality score to store the respective texts and the typicality scores thereof.

Here, the calculation of the typicality scores is performed such that the typicality scores are higher when the respective cooccurrence scores and the initial scores are higher. For example, it can be considered that the sum, the product, or the combination of the sum and the product of the respective cooccurrence scores and the initial scores are employed as the typicality score.

The text data selecting section 72 reads the text and the typicality scores thereof from the storage section 23 for text data with typicality score. Then, the text data selecting section 72 selects the text data based on the size relationships of the typicality scores or on values, and outputs the data to the text data display section 8.

The text data display section 8 displays the text data, which has been selected by the text data selecting section 72 based on the typicality of the content, along with the typicality score thereof.

Next, the overall operations of this embodiment will be described in detail with reference to FIG. 10 and a flow chart of FIG. 11.

In this embodiment, the cooccurrence dictionary storage section 21 has a function of producing the cooccurrence dictionary and a function of giving typicality scores to the text which is the target, to which the typicality is given, using the produced cooccurrence dictionary. The operation of producing the cooccurrence dictionary is the same as the operation of producing the cooccurrence dictionary in the first or second embodiment. Accordingly, the operations after producing the cooccurrence dictionary will be described hereinafter.

Figure 11:
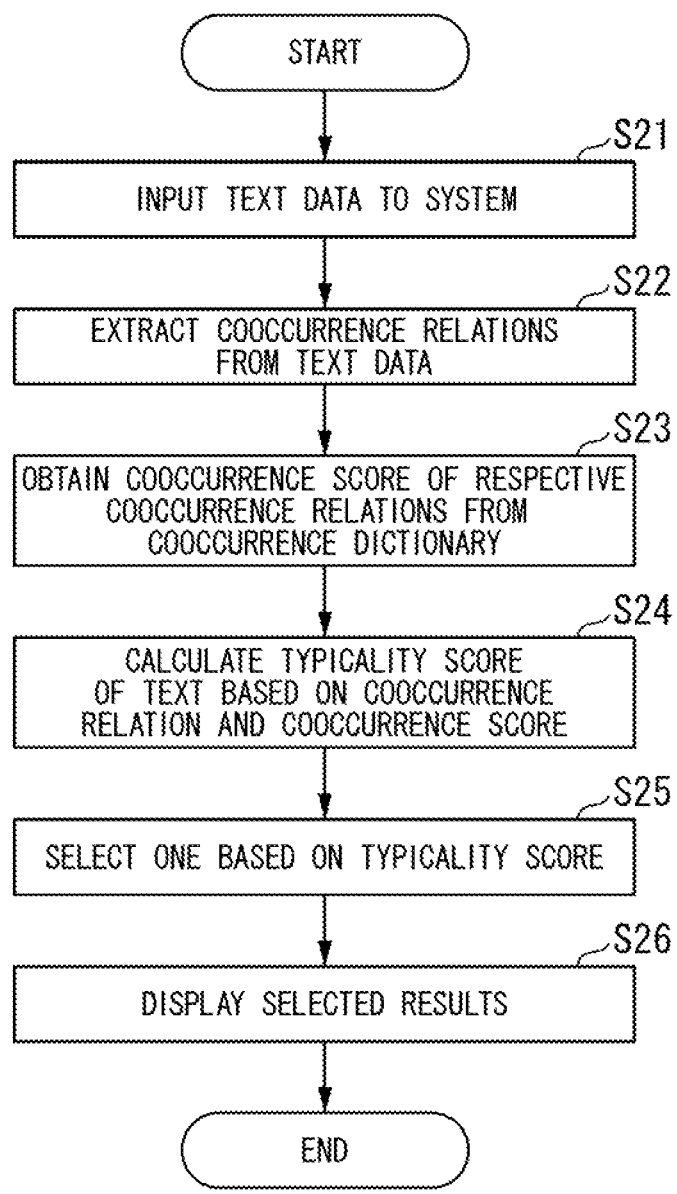
FIG. 11 is a flow chart illustrating operations of the third embodiment of the present invention.

First, the text data input section 6 causes the text data storage section 22 to store the text data to which the typicality is given by the cooccurrence dictionary (step S21 in FIG. 11).

FIGS. 12A and 12B shows examples of the data stored in the text data storage section 22 by the text data input section 6. FIG. 12A is a diagram illustrating an example of extraction results of the information extracting unit. FIG. 12B is a diagram illustrating an example of candidates for a hiragana-to-kanji conversion. FIG. 12A shows the information extraction results, which are obtained by extracting the relationships constituted by three words of "what point (attribution)" "of what (object)" and "how was it (evaluation)". FIG. 12B shows the candidates for hiragana-to-kanji conversion for "Itta (this Japanese word means 'went')" in the sentence "Yuenchi A Ni Itta (these Japanese words mean 'I went to an amusement park A')".

Next, the typicality scoring section 71 reads the text data from the text data storage section 22. Then, the typicality scoring section 71 extracts the cooccurrence relationships from the respective pieces of the text data (step S22 in FIG. 11). The typicality scoring section 71 performs the same processing as that of the language analyzing section 300 for the respective pieces of read text, and collects the cooccurrence relationships in the same manner as that of the cooccurrence relationship collecting section 301. That is, the typicality scoring section 71 performs the morpheme analysis on the text data, specifies the clauses, and analyzes the modification relationships between clauses. Then, the typicality scoring section 71 collects cooccurrences of nouns, modification relationships of nouns and declinable words, and modification relationships between declinable words within the text data in a unit of each clause.

The typicality scoring section 71 regards some combinations of words as cooccurrence relationships in the case of the records constituted by a plurality of words and when the texts are not sentences, as shown in FIG. 12A. For example, three cooccurrence relationships of "Yuenchi A (these Japanese words mean 'amusement park A), Fun-iki (this Japanese word means 'atmosphere')", "Yuenchi A(these Japanese words mean 'amusement park A'), Tanoshi (this Japanese word means 'fun')", and "Fun-iki (this Japanese word means 'atmosphere'), Tanoshi (this Japanese word means 'fun')" are extracted from the text of ID=1 in FIG. 12A. Here, when there is some meaning in a combination of words in text records, each of which is constituted by a plurality of words, it is applicable that the cooccurrence relationships are not found from all the combinations of the words, and the cooccurrence relationships may be limited.

For example, the "attributions" are viewpoints of the evaluations for the "objects" in FIG. 12A, and the "evaluations" are evaluations for the "attributions". The "evaluations" are not obtained by directly evaluating the "objects" themselves. That is, it is applicable to focus only on the two cooccurrence relationships of "objects, attributions" and "attributions, evaluation" in FIG. 12A. Hereinafter, the description will be made of the case in which cooccurrence relationships are extracted from the two relationships of "objects, attributions" and "attributions, evaluation". For the text of ID=1 in FIG. 12B, "Yuenchi A, itta (this Japanese word means 'said')" is extracted as the cooccurrence relationship.

Returning to the explanation of FIG. 11, the typicality scoring section 71 reads the cooccurrence dictionary from the cooccurrence dictionary storage section 21. Then, the typicality scoring section 71 obtains the cooccurrence score of the respective cooccurrence relationships extracted in step S22 in FIG. 11 (step S23 in FIG. 11).

FIG. 13 is a diagram illustrating an example of the cooccurrence dictionary stored in the cooccurrence dictionary storage section 21. Here, the data of the cooccurrence dictionary storage section 21 is the one produced in any one of the first and second embodiments of the present invention.

Next, the typicality scoring section 71 calculates the typicality scores for the typicality of the respective pieces of the text data obtained in step S22 based on the cooccurrence relationship of the respective pieces of the text data extracted in step S22, the initial score of the respective text data read in step S22, and the cooccurrence score of the respective cooccurrence relationships obtained in step S23 (step S24 in FIG. 11). Then, the typicality scoring section 71 causes the storage section 23 for text data with typicality score to store the respective texts and the typicality scores for the respective texts.

The description will be made of the operation while exemplifying the calculation of the typicality score for the text of ID=1 in FIG. 12A. In step S22 in FIG. 11, two cooccurrence relationships of "Yuenchi A (these Japanese words mean 'amusement park A'), Fun-iki (this Japanese word means 'atmosphere')" and "Fun-iki (this Japanese word means 'atmosphere'), Tanoshi (this Japanese word means 'fun')" are extracted from the text of ID=1 in FIG. 12A. It is understood with reference to the cooccurrence dictionary in FIG. 13 that the cooccurrence scores are as follows: "Yuenchi A (these Japanese words mean 'amusement park A'), Fun-iki (this Japanese word means 'atmosphere')=20" and "Fun-iki (this Japanese word means 'atmosphere'), Tanoshi (this Japanese word means 'fun')=20". The initial score for the text of ID=1 in FIG. 12A is 1. For example, the typicality score is set as a sum of the initial score and the cooccurrence score for the respective cooccurrence relationships. The typicality scoring section 71 calculates the typicality score of the text of ID=1 in FIG. 12A as 41 (=20+20+1). In the same manner, the typicality scoring section 71 calculates the typicality scores of the texts of IDs=2 to 4 shown in FIG. 12A as follows: the typicality score of the text of ID=2 is 351 (=100+250+1), the typicality score of the text of ID=3 is 351 (=150+200+1), and the typicality score of the text of ID=4 is 21 (=20+0+1).

As for the typicality scores of the texts of IDs=1 to 4 in FIG. 12B, the respective cooccurrence relationships and the cooccurrence score thereof are as follows from FIG. 13 in the same manner: "Yuenchi A (these Japanese words mean 'amusement park A'), itta (this Japanese word means 'said')=10", "Yuenchi A (amusement park A), itta (this Japanese word also means 'went')=300", "Yuenchi A (amusement park A), itta (this Japanese word also means 'needed')=0", and "Yuenchi A (amusement park A), itta (this Japanese word also means 'roasted')=10". When the sums are calculated, the following results are obtained: the sum for the text of ID=1 is 11 (=10+1), the sum for the text of ID=2 is 301 (=300+1), the sum for the text of ID=3 is 1 (=0+1), and the sum for the text of ID=4 is (=0+1), FIG. 14A is a diagram illustrating an example of the typicality scores of the information extraction results. FIG. 14B is a diagram illustrating an example of the typicality scores of the candidates for the hiragana-to-kanji conversion.

The typicality scoring section 71 calculates the typicality scores from the data, which is stored in the text data storage section 22, shown in FIGS. 12A and 12B and the data, which is stored in the cooccurrence dictionary storage section 21, shown in FIG. 13. The typicality scoring section 71 causes the storage section 23 for text data with typicality score to store the typicality scores and the text data.

Returning to the explanation of FIG. 11, the text data selecting section 72 reads the data from the storage section 23 for text data with typicality score. Then, the text data selecting section 72 selects the text to be displayed based on the typicality score of the respective texts (step S25 in FIG. 11). For example, in FIG. 14A, when the data with the typicality scores of not less than 40 is picked up, it is determined that the text with ID=4 is not typical. Accordingly, the texts with IDs=1 to 3 are selected without selecting the text with ID=4. In addition, in FIG. 14B, when the texts are ranked based on the typicality scores, it is possible to obtain a semantically likely order of the hiragana-to-kanji conversion.

At last, the text data display section 8 displays the text selected by the text data selecting section 72 (step S26 in FIG. 11).

Next, the effects of this embodiment will be described.

According to this embodiment, it is possible to calculate the degrees of the semantic typicality of the contents of the text data. This is because the cooccurrence dictionary is used which is created in the first or second embodiment by limiting its target only to the cooccurrence relationships with high semantic relationships.

In this embodiment, when the text as a target to which the typicality is given is a sentence, the typicality scoring section 71 subjects the text to morpheme analysis, the clause specification, and the modification relationship analysis between the clauses. Then, the typicality scoring section 71 collects the cooccurrences of nouns, modification relationships of nouns and declinable words, and modification relationships between declinable words in the text in a unit of clause, as the cooccurrence relationships. Thereafter, the typicality scoring section 71 obtains the cooccurrence scores corresponding to the collected cooccurrence relationships from the cooccurrence dictionary, and calculates the degrees of the typicality of the contents of the text. Accordingly, it is possible to more precisely calculate the degrees of the semantic typicality of the contents of the text.

In addition, the cooccurrence relationships collected from the text as a target to which the typicality is given may not be limited to the ones relating to cooccurrences of nouns, modification relationships of nouns and declinable words, and modification relationships between declinable words. In such a case, it is possible to achieve precision to some degree since the cooccurrence dictionary created by targeting only the cooccurrence relationships with strong semantic relationships is used.

Moreover, according to this embodiment, when the text as a target to which the degree of the typicality is given is a record constituted by a plurality of words, the typicality scoring section 71 collects the combinations of words which have meaning when combined together as the cooccurrence relationships from among all the combinations of words. Then, the typicality scoring section 71 obtains the cooccurrence scores corresponding to the collected cooccurrence relationships from the cooccurrence dictionary, and calculates the degrees of the typicality of the contents of the text. For this reason, it is possible to more precisely calculate the degrees of the semantic typicality of the contents of the text.

In addition, it may not be limited to the combinations of words which have meaning when combined together. In such a case, it is possible to achieve precision to some degree since the cooccurrence dictionary created by targeting only the cooccurrence relationships with strong semantic relationships is used.

(Fourth Embodiment)

Next, the detailed description will be made of a fourth embodiment of the present invention with reference to accompanying drawings.

Figure 15:
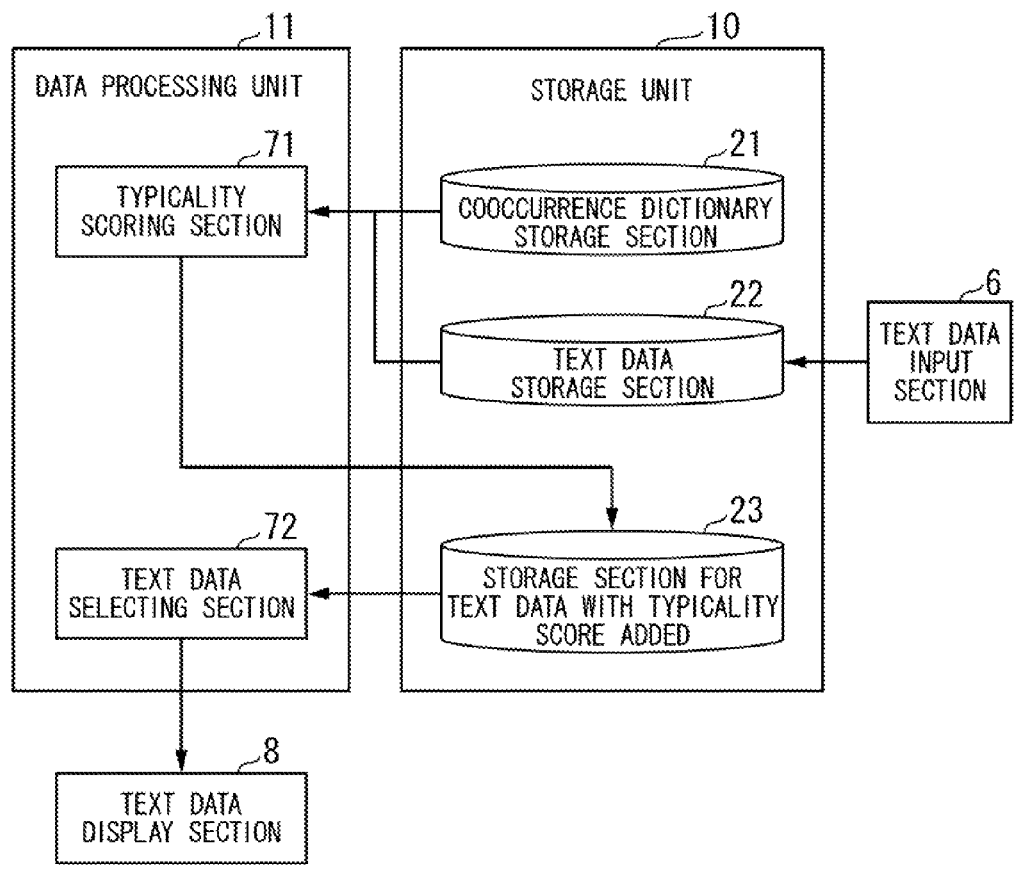
FIG. 15 is a block diagram illustrating a configuration of a fourth embodiment of the present invention.

FIG. 15 is a block diagram illustrating a configuration of the fourth embodiment of the present invention.

The fourth embodiment of the present invention is different from the third embodiment (FIG. 10) in that the configuration of the third embodiment includes a storage unit 10 and a data processing unit 11 instead of the storage unit 9 and the data processing unit 7. In addition, the fourth embodiment is different from the third embodiment in that the configuration of the fourth embodiment does not include the corpus input section 1.

The storage unit 10 is different from the storage unit 9 in that the storage unit 10 does not include the corpus storage section 20.

The data processing unit 11 is different from the data processing unit 7 in that the data processing unit 11 does not include the cooccurrence dictionary creating section 70.

This embodiment is different from the third embodiment in that the cooccurrence dictionary produced using the cooccurrence dictionary creating section 30 of the first embodiment or the cooccurrence dictionary creating section 50 of the second embodiment is stored in advance in the cooccurrence dictionary storage section 21.

Next, the overall operations of this embodiment will be described. In this embodiment, since the cooccurrence dictionary is stored in advance in the cooccurrence dictionary storage section 21, the operation of producing the cooccurrence dictionary is not needed. The other operations, that is, the operation of the typicality scoring section 71 giving the typicality to the text data using the cooccurrence dictionary stored in the cooccurrence dictionary storage section 21, the operation of the text data selecting section 72 selecting the text to be displayed on the text data display section 8 based on the typicality scores of the respective texts, and the like are the same as those in the third embodiment. For this reason, the description thereof will be omitted.

Next, the effects of this embodiment will be described.

According to this embodiment, it is possible to achieve the same effects as those of the third embodiment and calculate the degrees of the semantic typicality of the contents of the text data at a high speed. This is because there is no need to take time to create the cooccurrence dictionary by using the cooccurrence dictionary produced in advance.

As described above, the embodiments of the present invention were described. However, the present invention is not limited to each of the above embodiments, and various types of additions and modifications are available. It is needless to say that the functions of the present invention can be implemented by hardware. In addition, the functions can be implemented by a computer and a program. The program can be provided by being recorded in a computer readable recording medium such as a magnetic disc, a semiconductor memory, or the like. The program is read by a computer at the time of starting the computer. The read program controls the operations of the computer. Accordingly the program causes the computer to function as the respective function parts of the data processing unit in the respective embodiments, and to execute the processing steps as described above.

Figure 16:
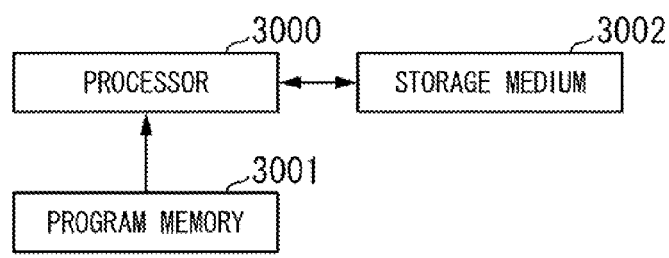
FIG. 16 is a general block configuration diagram of an information processing system in which a system according to the embodiments of the present invention is implemented.

FIG. 16 is a general block configuration diagram of an information processing system obtained by implementing the system according to the respective embodiments of the present invention. The information processing system shown in FIG. 16 includes a processor 3000, a program memory 3001, and a storage medium 3002. It is possible to use a magnetic storage medium such as a RAM, a hard disk, or the like as the storage medium 3002. A program for executing the processing steps, which are performed by the data processing unit in one of the first to fourth embodiments, is stored in the program memory 3001. The processor 3000 operates by this program. The storage medium 3002 is used as the storage unit in the first to fourth embodiment.

Industrial Applicability

The present invention can be applied to a system and the like for producing a cooccurrence dictionary to be used for semantic analysis of natural languages such as modification relationship analysis, document proofreading, hiragana-to-kanji conversion, evaluation of semantic consistency of an information extraction result, evaluation of a degree of semantic typicality of a text, and the like.

The invention claimed is:

1. A cooccurrence dictionary creating system comprising:
a data processing unit configured to include
a language analyzing section which subjects a text to a morpheme analysis, a clause specification, and a modification relationship analysis between clauses,
a cooccurrence relationship collecting section which collects cooccurrences of nouns in each clause of the text, modification relationships of nouns and declinable words, and modification relationships between declinable words as cooccurrence relationships,
a cooccurrence score calculating section which calculates a cooccurrence score of the cooccurrence relationship based on a frequency of the collected cooccurrence relationship; and
a storage unit configured to include a cooccurrence dictionary storage section which stores a cooccurrence dictionary in which a correspondence between the calculated cooccurrence score and the cooccurrence relationship is described, wherein the cooccurrence score calculating section estimates as a cooccurrence score a cooccurrence ratio of two arbitrary words constituting the collected cooccurrence relationship based on the cooccurrence relationship collected by the cooccurrence relationship collecting section and the frequency thereof.

2. The cooccurrence dictionary creating system according to claim 1, wherein
the data processing unit comprises
a topic splitting section which detects changing points of topics of the text based on the analysis result of the language analyzing section and splits the analysis result, wherein the cooccurrence relationship collecting section collects the cooccurrence relationship for each of the analysis results split at the changing points of the topics.

3. The cooccurrence dictionary creating system according to claim 1, wherein
the data processing unit comprises
a typicality scoring section which collects cooccurrence relationships in a text as a target to which typicality is given, obtains cooccurrence scores corresponding to the collected cooccurrence relationships from the cooccurrence dictionary, and calculates a degree of typicality of contents of the text as the target to which the typicality is given.

4. The cooccurrence dictionary creating system according to claim 3, wherein the typicality scoring section subjects the text as the target to which the typicality is given to morpheme analysis, the clause specification, and the modification relationship analysis between clauses, and collects the cooccurrences of nouns in each clause of the text as the target to which the typicality is given, the modification relationships of nouns and declinable words, and the modification relationships between declinable words as the cooccurrence relationships.

5. The cooccurrence dictionary creating system according to claim 3, wherein the typicality scoring section collects combinations of a plurality of words constituting the text as the target to which the typicality is given, as the cooccurrence relationships.

6. The cooccurrence dictionary creating system according to claim 3, wherein the typicality scoring section collects as the cooccurrence relationships the combinations, each of which is constituted by combinations of words which have meaning when combined together from among combinations of the plurality of words constituting the texts as the targets to each of which the typicality is given.

7. The cooccurrence dictionary creating system according to claim 3, wherein when an initial score is given to the text as the target to which the typicality is given, the typicality scoring section calculates the degree of typicality based on the cooccurrence score obtained from the cooccurrence dictionary and the initial score.

8. A scoring system comprising:
a data processing unit configured to include a cooccurrence dictionary in which correspondences between cooccurrence relationships and cooccurrence scores are described while the cooccurrence dictionary regards cooccurrence of nouns collected from the text, modification relationship of nouns and declinable words, and modification relationships between declinable words as the cooccurrence relationships, and regards values calculated based on frequencies of the collected cooccurrence relationships as the cooccurrence scores; and
a storage unit configured to include a typicality scoring section which collects cooccurrence relationships in a text as a target to which typicality is given, obtains cooccurrence scores corresponding to the collected cooccurrence relationships from the cooccurrence dictionary, and calculates a degree of typicality of contents of the text as the target to which the typicality is given.

9. The scoring system according to claim 8, wherein the typicality scoring section subjects the text as the target to which the typicality is given to morpheme analysis, the clause specification, and the modification relationship analysis between clauses, and collecting the cooccurrences of nouns in each clause of the text as the target to which the typicality is given, the modification relationships of nouns and declinable words, and the modification relationships between declinable words as the cooccurrence relationships.

10. The scoring system according to claim 8, wherein the typicality scoring section collects combinations of a plurality of words constituting the text as the target to which the typicality is given, as the cooccurrence relationships.

11. The scoring system according to claim 8, wherein the typicality scoring section collects the combinations of words which have meaning when combined together from among combinations of the plurality of words constituting the texts as the targets to each of which the typicality is given, as the cooccurrence relationships.

12. The scoring system according to claim 8, wherein when an initial score is given to the text as the target to which the typicality is given, the typicality scoring section calculates the degree of typicality based on the cooccurrence score obtained from the cooccurrence dictionary and the initial score.

13. A cooccurrence dictionary creating method comprising:
subjecting a text to a morpheme analysis, a clause specification, and a modification relationship analysis between clauses, collecting cooccurrences of nouns in each clause of the text, modification relationships of nouns and declinable words, and modification relationships between declinable words as cooccurrence relationships; calculating a cooccurrence score of the cooccurrence relationship based on a frequency of the collected cooccurrence relationship, and causing a cooccurrence dictionary storage section to store a cooccurrence dictionary in which a correspondence between the calculated cooccurrence score and the cooccurrence relationship is described,
wherein in the cooccurrence score calculation, a cooccurrence ratio of two arbitrary words constituting the collected cooccurrence relationship is estimated as a cooccurrence score based on the cooccurrence relationship collected in the cooccurrence relationship collection and the frequency thereof.

14. The cooccurrence dictionary creating method according to claim 13, further comprising: detecting changing points of topics of the text based on the analysis result in the language analysis and splitting the analysis result, wherein in the cooccurrence relationship collection, the cooccurrence relationships are collected for each of the analysis results split at the changing points of the topics.

15. The cooccurrence dictionary creating method according to claim 13, further comprising: collecting cooccurrence relationships in a text as a target to which typicality is given, obtaining cooccurrence scores corresponding to the collected cooccurrence relationships from the cooccurrence dictionary, and calculating a degree of typicality of contents of the text as the target to which the typicality is given.

16. The cooccurrence dictionary creating method according to claim 15, wherein in the typicality scoring, the text as the target to which the typicality is given is subjected to morpheme analysis, the clause specification, and the modification relationship analysis between clauses, and the cooccurrences of nouns in each clause of the text as the target to which the typicality is given, the modification relationships of nouns and declinable words, and the modification relationships between declinable words are collected as the cooccurrence relationships.

17. The cooccurrence dictionary creating method according to claim 15, wherein in the typicality scoring, combinations of a plurality of words constituting the text as the target to which the typicality is given are collected as the cooccurrence relationships.

18. The cooccurrence dictionary creating method according to claim 15, wherein in the typicality scoring, the combinations of words which have meaning when combined together are collected as the cooccurrence relationships, from among combinations of the plurality of words constituting the texts as the targets to each of which the typicality is given.

19. The cooccurrence dictionary creating method according to claim 15, wherein in the typicality scoring, when an initial score is given to the text as the target to which the typicality is given, the degree of typicality is calculated based on the cooccurrence score obtained from the cooccurrence dictionary and the initial score.

20. A scoring method of an information processing unit including a cooccurrence dictionary in which correspondences between cooccurrence relationships and cooccurrence scores are described while the cooccurrence dictionary regards cooccurrence of nouns collected from a text, modification relationship of nouns and declinable words, and modification relationships between declinable words as the cooccurrence relationships, and regards values calculated based on frequencies of the collected cooccurrence relationships as the cooccurrence scores, the method comprising: collecting cooccurrence relationships in a text as a target to which typicality is given, obtaining cooccurrence scores corresponding to the collected cooccurrence relationships from the cooccurrence dictionary, and calculating a degree of typicality of contents of the text as the target to which the typicality is given.

21. The scoring method according to claim 20, wherein in the typicality scoring, the text as the target to which the typicality is given is subjected to morpheme analysis, the clause specification, and the modification relationship analysis between clauses, and the cooccurrences of nouns in each clause of the text as the target to which the typicality is given, the modification relationships of nouns and declinable words, and the modification relationships between declinable words are collected as the cooccurrence relationships.

22. The scoring method according to claim 20, wherein in the typicality scoring, combinations of a plurality of words constituting the text as the target to which the typicality is given are collected as the cooccurrence relationships.

23. The scoring method according to claim 20, wherein in the typicality scoring, the combinations of words which have meaning when combined together are collected as the cooccurrence relationships, from among combinations of the plurality of words constituting the texts as the targets to each of which the typicality is given.

24. The scoring method according to claim 20, wherein in the typicality scoring, when an initial score is given to the text as the target to which the typicality is given, the degree of typicality is calculated based on the cooccurrence score obtained from the cooccurrence dictionary and the initial score.

25. A computer-readable recording medium having recorded a program which is readable by an information processing unit, the am, when executed by the information processing unit, causes the information processing unit to execute:
subjecting a text to a morpheme analysis, a clause specification, and a modification relationship analysis between clauses;
collecting cooccurrences of nouns in each clause of the text, modification relationships of nouns and declinable words, and modification relationships between declinable words as cooccurrence relationships;
calculating a cooccurrence score of the cooccurrence relationship based on a frequency of the collected cooccurrence relationship; and
causing a cooccurrence dictionary storage section to store a cooccurrence dictionary in which a correspondence between the calculated cooccurrence score and the cooccurrence relationship is described,
wherein in the cooccurrence score calculation, a cooccurrence ratio of two arbitrary words constituting the collected cooccurrence relationship is estimated as a cooccurrence score based on the cooccurrence relationship collected in the cooccurrence relationship collection and the frequency thereof.

26. The computer-readable recording medium according to claim 25, wherein the prom further causes the information processing unit to execute:
detecting changing points of topics of the text based on the analysis result in the language analysis and splitting the analysis result, wherein in the cooccurrence relationship collection, the cooccurrence relationships are collected for each of the analysis results split at the changing points of the topics.

27. The computer-readable recording medium according to claim 25, wherein the prom further causes the information processing unit to execute:
collecting cooccurrence relationships in a text as a target to which typicality is given, obtaining cooccurrence scores corresponding to the collected cooccurrence relationships from the cooccurrence dictionary, and calculating a degree of typicality of contents of the text as the target to which the typicality is given.

28. The computer-readable recording medium according to claim 27, wherein in the typicality scoring, the text as the target to which the typicality is given is subjected to morpheme analysis, the clause specification, and the modification relationship analysis between clauses, and the cooccurrences of nouns in each clause of the text as the target to which the typicality is given, the modification relationships of nouns and declinable words, and the modification relationships between declinable words are collected as the cooccurrence relationships.

29. The computer-readable recording medium according to claim 27, wherein in the typicality scoring, combinations of a plurality of words constituting the text as the target to which the typicality is given are collected as the cooccurrence relationships.

30. The computer-readable recording medium according to claim 27, wherein in the typicality scoring, the combinations of words which have meaning when combined together are collected as the cooccurrence relationships, from among combinations of the plurality of words constituting the texts as the targets to each of which the typicality is given.

31. The computer-readable recording medium according to claim 27, wherein in the typicality scoring, when an initial score is given to the text as the target to which the typicality is given, the degree of typicality is calculated based on the cooccurrence score obtained from the cooccurrence dictionary and the initial score.

32. A computer-readable recoding medium having recorded a program which is readable by an information processing unit, which includes a cooccurrence dictionary in which correspondences between cooccurrence relationships and cooccurrence scores are described while the cooccurrence dictionary regards cooccurrence of nouns collected from a text, modification relationship of nouns and declinable words, and modification relationships between declinable words as the cooccurrence relationships, and regards values calculated based on frequencies of the collected cooccurrence relationships as the cooccurrence scores, the program causes the information processing unit to execute:

collecting cooccurrence relationships in a text as a target to which typicality is given;

obtaining cooccurrence scores corresponding to the collected cooccurrence relationships from the cooccurrence dictionary; and calculating a degree of typicality of contents of the text as the target to which the typicality is given.

33. The computer-readable recoding medium according to claim 32, wherein in the typicality scoring, the text as the target to which the typicality is given is subjected to morpheme analysis, the clause specification, and the modification relationship analysis between clauses, and the cooccurrences of nouns in each clause of the text as the target to which the typicality is given, the modification relationships of nouns and declinable words, and the modification relationships between declinable words are collected as the cooccurrence relationships.

34. The computer-readable recoding medium according to claim 32, wherein in the typicality scoring, combinations of a plurality of words constituting the text as the target to which the typicality is given are collected as the cooccurrence relationships.

35. The computer-readable recoding medium according to claim 32, wherein in the typicality scoring, the combinations of words which have meaning when combined together are collected as the cooccurrence relationships, from among combinations of the plurality of words constituting the texts as the targets to each of which the typicality is given.

36. The computer-readable recoding medium according to claim 32, wherein in the typicality scoring, when an initial score is given to the text as the target to which the typicality is given, the degree of typicality is calculated based on the cooccurrence score obtained from the cooccurrence dictionary and the initial score.

* * * * *